United States Patent [19]

Furno et al.

[11] Patent Number: 4,987,188

[45] Date of Patent: Jan. 22, 1991

[54] IMPACT MODIFICATION OF A HEAT RESISTANT THERMOPLASTIC POLYIMIDE

[75] Inventors: John S. Furno; E. Bruce Nauman, both of Schenectady, N.Y.

[73] Assignee: General Electric Company, Pittsfield, Mass.

[21] Appl. No.: 402,788

[22] Filed: Sep. 5, 1989

[51] Int. Cl.$^5$ ............................................. C08L 79/08
[52] U.S. Cl. ..................................... 525/180; 525/928
[58] Field of Search ........................................ 525/180

[56] References Cited

U.S. PATENT DOCUMENTS 4,433,104 2/1984 Giles ..................................... 525/180
4,816,516 3/1989 Yamaya et al. ...................... 525/180

Primary Examiner—Ana L. Carrillo
Attorney, Agent, or Firm—Notaro & Michalos

[57] ABSTRACT

A method of producing an impact modified polymer comprises dissolving a high-temperature polyetherimide and a high-temperature fluorelastomer in a common solvent to form a single phase solution which is heated to a temperature that would normally vaporize the solvent. The solution is maintained at an elevated pressure to avoid vaporization of the solvent. After being heated at the elevated temperature, the solution is subjected to flash evaporation by introducing the solution into a zone of reduced pressure. This forms a blend of the polyetherimide into which the fluorelastomer is micro-dispersed. A composition of matter formed by the method advantageously includes a solid component having 90% by weight ULTEM 1000 polyetherimide and 10% by weight VITON A fluorelastomer. Dimethyl formamide is advantageously used as the common solvent.

10 Claims, 5 Drawing Sheets

IMPACT MODIFICATION OF A HEAT RESISTANT THERMOPLASTIC POLYIMIDE

FIELD AND BACKGROUND OF THE INVENTION

The present invention relates in general to polymers, and in particular to a new a useful method and composition for modifying the impact characteristics of polymers.

The impact modification of polymers is possible through incorporation of rubbery phase domains into an otherwise brittle polymer matrix. High impact polystyrene (HIPS), acrylonitrile-butadiene-styrene (ABS), and modified epoxies are well-known and important materials that employ this technique. The size of the rubber phase domains in many cases determines the degree of toughening that occurs in a particular system.

Two phase rubber/polymer blends have been produced by a number of methods. These methods include mechanical blending, precipitation polymerization, emulsion polymerization, and block copolymerization. These existing processes have limitations and cannot always be used to produce the desired micro-dispersion. See Nauman, E. B., et al., *Chem. Eng. Comm.*, 66, 29 (1988).

A new process called compositional quenching, has been developed in which a blend of finely dispersed rubbery phase within a continuous polymer phase can be created by rapid removal of the solvent from a single phase polymer solution. As the solvent is being removed, phase separation occurs by spinodal decomposition. The size of the rubber phase domain is, in part, a function of the rate of solvent removal. High rates of solvent removal produce very small particles. See Nauman, S. and Strella, S., *J. Appl. Poly. Sci.*, 9, 2297-2310 (1965), and Bucknall, C. B. "Toughened Plastics", *Applied Science*, London, (1977), as well as U.S. Pat. Nos. 4,594,371 and 4,666,961 to Nauman.

A high-temperature polyetherimide, sold under the tradename ULTEM 1000 (ULTEM is a registered trademark of the General Electric Company) is in a group of polymers which are particularly interesting for military, electronic, and automotive applications, where thermal stability is important. Most heat-resistant polymers are quite brittle, however. This brittleness is often due to the stiff polymer backbone that also imparts the high thermal stability. It is difficult to alter the polymer backbone to add toughness without adversely affecting thermal stability.

SUMMARY OF THE INVENTION

In order to improve the toughness of certain high-temperature polymers without greatly sacrificing the heat resistance thereof, the present invention involves the addition of a thermally stable elastomer into a matrix formed by the high-temperature polymer. The elastomer is introduced as an impact modifier for the polymer.

The present invention is drawn both to a method for producing the impact modified polymer, and to a composition of matter for the impact modified polymer.

The method of the present invention includes compositional quenching which forms a micro-dispersion of the elastomer phase within a matrix of the polymer. The preferred embodiment of the blend includes ULTEM polymer as the matrix into which VITON fluorelastomer is micro-dispersed. VITON is a trademark of DuPont. The addition of VITON fluorelastomer as a dispersed rubber or elastomer phase, within the ULTEM polyetherimide, provides impact resistance to an otherwise brittle, flaw sensitive material. The uniqueness of the blend is in that it combines relatively exotic polymers that have excellent heat and thermal resistance to produce a toughened material without drastically sacrificing thermal and chemical stability. The blend can be produced through the compositional quenching process to form the desired rubber phase micro-dispersion. Alternatively, conventional blending methods can be used. It has been evidenced by tests conducted with both types of blends, however, that the blends produced by conventional blending methods do not perform as well as blends made by compositional quenching. Examples of compositional quenching can be found in the U.S. patents to Nauman identified above.

The compositionally quenched blend of the present invention is impact modified and has superior tensile behavior in comparison to extrusion blends of the same starting materials.

Accordingly, an object of the present invention is to provide an impact modified polymer blend which comprises a matrix of polyetherimide with a dispersed phase of fluorelastomer therein. A further object of the present invention is to provide such a blend wherein the polyetherimide comprises ULTEM polyetherimide and the fluorelastomer comprises VITON fluorelastomer. A still further object of the present invention is to provide such a blend which is produced by a compositional quenching technique.

Another further object of the present invention is to provide a method of forming an impact modified polymer blend having a matrix of polyimide with a micro-dispersion of fluorelastomer therein, comprising dissolving the polyimide and the fluorelastomer in a common solvent to form a single phase solution, heating the solution to an elevated temperature sufficient to vaporize the solution at a selected pressure, maintaining the solution under an elevated pressure above the selected pressure to prevent vaporization of the solvent and thereafter introducing the solution into a zone at the selected pressure for flash evaporating the solvent to form the impact modified polymer blend.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

DESCRIPTION OF THE PREFERRED EMBODIMENTS

Figure 1:
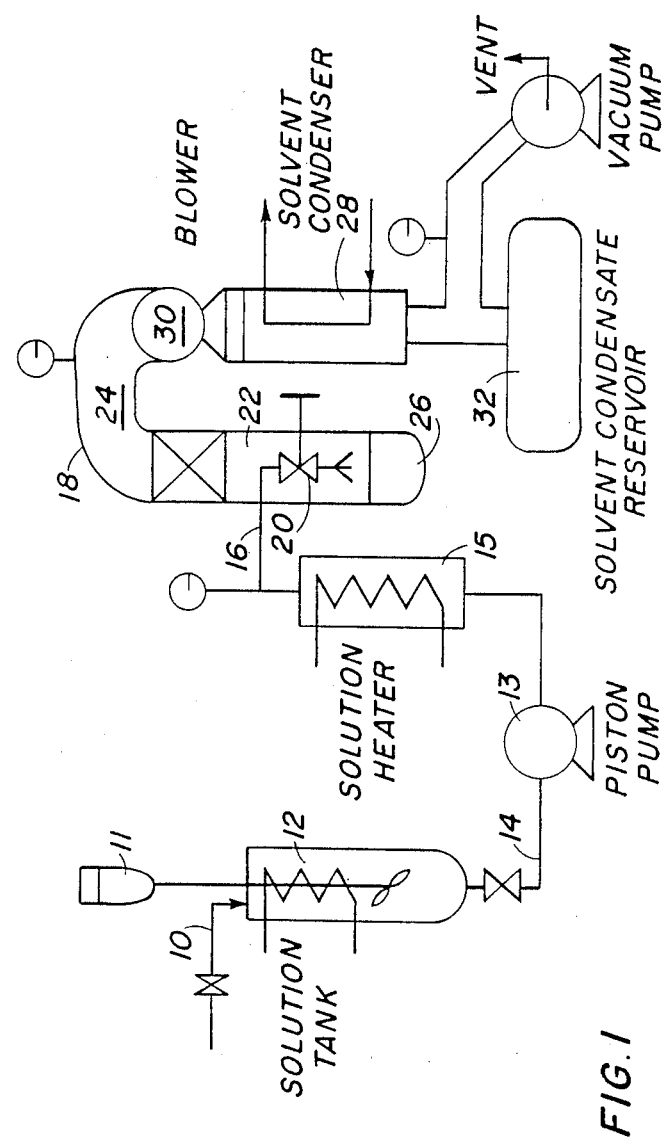
FIG. 1 is a schematic diagram of apparatus for performing the compositional quenching method of the present invention.

The equipment used for compositional quenching according to the present invention is schematically shown in FIG. 1. A storage tank 12 with supply line 10 and stirrer 11 stores a supply of a single phase solution containing an elastomer, a polyimide and a solvent. The single phase polymer solution from storage tank 12 is first pumped by a pump 13 on lines 14 and 16 through a heat exchanger 15 in order to accept heat which will ultimately be used to vaporize the solvent. The polymer solution is typically heated to 200° to 300° C. In order to prevent the solvent in the solution from boiling within the heat exchanger and in the lines 14 and 16 before it reaches a flash chamber 18, the heated solution is kept under relatively high pressure, typical over 500 psi. This heated, pressurized solution is then flashed across a flash valve 20 into an evacuated chamber 22 in flash chamber 18. Most of the solvent rapidly vaporizes and exits through the top 24 of the flash chamber 18, leaving behind a two phase polymer blend at 26. The solvent vapors are then supplied to and condensed in a condenser 28 by a blower 30, collected in a collection tank 32, and recycled. The polymer blend 26 is collected at the bottom of the flash chamber 18 for further processing. The polymer product often contains large amounts of solvent, typically about 50% by weight, so that further devolatilization is needed. Despite the residual solvent, the mixture collected in the flash chamber has a relatively high viscosity. The high viscosity lowers molecular and Brownian diffusion and prevents agglomeration or coarsening of the rubber phase. The product is a viscosity-stabilized suspension of elastomer particles in a continuous polymer matrix that is sufficiently stable to survive subsequent processing.

Polyimides characterized by their five-membered nitrogen-containing ring are particularly known for their thermal stability. Polyimides come in the form of both thermoset and thermoplastic polymers. One polyimide that includes ether linkages to provide its thermoplastic nature is ULTEM polyetherimide. ULTEM polyetherimide is commonly used for electrical components and in aircraft. ULTEM 1000, a high viscosity no additives grade of the polyetherimide, was used in the present invention. The trademark VITON identifies a series of fluoroelastomers based on the copolymer of vinylidene fluoride and hexafluoropropylene which is characterized by its resistance to corrosive liquids and chemicals up to about 300° C. and its usefulness for continuous service at about 200°-230° C. VITON fluorelastomer is used as the modifying agent of this invention due to its thermal stability. VITON A fluorelastomer can withstand temperatures in excess of 200° C. without significant degradation.

Dimethyl formamide was found as a suitable solvent which would dissolve both the ULTEM and VITON components as required for the compositional quenching process of the invention. No block copolymers or surface-active agents were employed in any of the experiments which follow.

Experiment

The single phase polymer solution required as the feed for the compositional quenching process illustrated in FIG. 1, consisted of 2.5% by weight of the combined polymers in dimethyl formamide (DMF), the individual polymers being in the ratio of 90% ULTEM 1000 and 10% VITON A by weight. The solution was heated to 60° C. in order to dissolve all of the polymer and provide a single phase solution. The polymer solution was fed to the compositional quenching apparatus of FIG. 1 and heated in heat exchanger 15 to a temperature of 290° C. just before the flash needle valve 20. It was then flashed across this flash needle valve into vacuum chamber 22 which was held at 3.5 Torr. The partially devolatilized product was found to consist of approximately 40% polymer by weight.

The solution may have from 95 to 99% by weight solvent with the remainder being 85 to 95% by weight ULTEM and 15–5% by weight VITON. Any volatizable solvent that is common for ULTEM and VITON can be used.

The produce was then processed to remove the remaining DMF. First, the material was allowed to air dry at room temperature for 12 hours. This was followed by placing the material in a vacuum oven under full vacuum and ramping the temperature from 25° C. to 180° C. over six hours. Next the polymer was ground in a mill (Wiley Model #3) through a 2 mm sieve to produce a granular material which was subsequently placed in a vacuum oven for 24 hours at 150° C. and full vacuum. Finally, the polymer blend was passed through a Werner-Pfleiderer (WP) vented, 30 mm, twin screw extruder. The material was allowed to harden and a sample was cut in an ultramicrotome. The sample was then soaked in methyl ethyl ketone for two hours in order to selectively dissolve the VITON A and thus etch the polished surface for use in creating the micrographs of FIGS. 3 and 4.

Results

A comparison of the mechanical properties for the experimental materials is given in Table 1. It is apparent that the addition of 10% VITON A is an effective method to impact modify ULTEM. Virtually a threefold improvement in Izod impact strength is observed with a 10% addition of VITON A in blends made by both compositional quenching and extrusion (at all screw speeds). This major improvement in impact strength is coupled with a relatively small sacrifice in yield strength and modulus (−16% and −14%, respectively, for the compositionally quenched blend).

Table 2 illustrates results achieved for 95/5, 90/10 and 85/15 compositions of ULTEM-VITON according to the present invention. Some sacrifice in modulus and yield strength is evident as a tradeoff to improve impact strength in blends having a higher rubber content. The blends were produced by compositional quenching and had an average rubber particle size of slightly less than one-half a micron.

Figure 4:
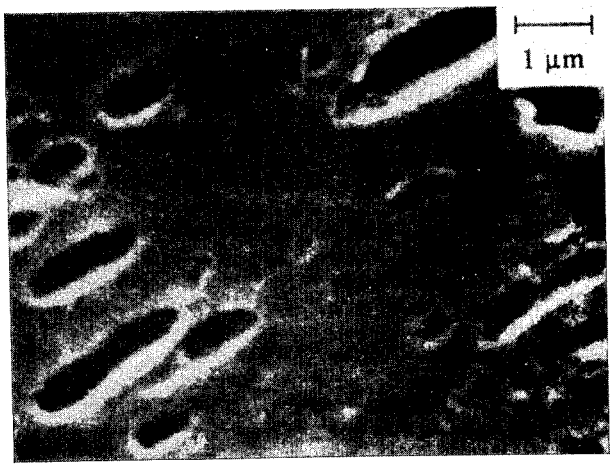
FIG. 4 is a micrograph similar to that of FIG. 3 showing the polished and etched surface of a 90/10 ULTEM-VITON blend produced by extrusion at 200 rpm.

The blend containing 5% by weight VITON showed a modest improvement in impact strength. From the results disclosed here and additional tests conducted on the various compositions for the blend, good results can be anticipated with from about 5 to 20% by weight VITON in the ULTEM-VITON blend of the present invention.

compositionally quenched material. FIG. 4 shows the etched surface of the 200 rpm extruded blend. The rubber domains are substantially larger ($\approx 2.5$ μm) than those found in the compositionally quenched blend. In addition, the particles are no longer spherical in shaped,

TABLE 1
MECHANICAL PROPERTY COMPARISON BETWEEN ULTEM AND VARIOUS 90/10 ULTEM-VITON BLENDS

|  | Ultem ® 1000 | 90/10 Ultem-Viton Compositional Quenching | 90/10 Ultem-Viton Extruded 100 RPM | 90/10 Ultem-Viton Extruded 200 RPM | 90/10 Ultem-Viton Extruded 300 RPM | 90/10 Ultem-Viton Extruded 300(2) RPM |
| --- | --- | --- | --- | --- | --- | --- |
| Izod Impact Strength [ft · lb/in] | 0.58 | 1.51 | 1.71 | 1.42 | 1.37 | 1.46 |
| Yield Strength [psi] | 14,400 | 12,200 | 12,200 | 13,000 | 13,200 | 12,900 |
| Yield Strain [in/in] | .165 | .165 | .155 | .158 | .168 | .174 |
| Tensile Modulus [psi] | 171,500 | 146,700 | 148,200 | 158,100 | 150,700 | 143,100 |
| Strength @ Break [psi] | 15,000 | 10,700 | 6,100 | 7,600 | 8,100 | 7,400 |
| Elongation [%] | 137 | 56 | 20 | 25 | 24 | 27 |

TABLE 2
MECHANICAL PROPERTIES OF ULTEM-VITON BLENDS OF VARIOUS RUBBER CONTENTS

|  | Ultem ® 1000 | 95/5 Ultem-Viton Compositional Quenching | 90/10 Ultem-Viton Compositional Quenching | 85/15 Ultem-Viton Compositional Quenching |
| --- | --- | --- | --- | --- |
| Izod Impact Strength [ft · lb/in] | 0.58 | 0.70 | 1.42 | 1.96 |
| Yield Strength [psi] | 14,400 | 13,800 | 12,200 | 11,700 |
| Yield Strain [in/in] | .165 | .166 | .165 | .171 |
| Tensile Modulus [psi] | 171,500 | 162,800 | 146,700 | 136,500 |
| Strength @ Break [psi] | 15,000 | 10,200 | 10,700 | 10,000 |
| Elongation [%] | 137 | 26 | 56 | 41 |

Figure 2:
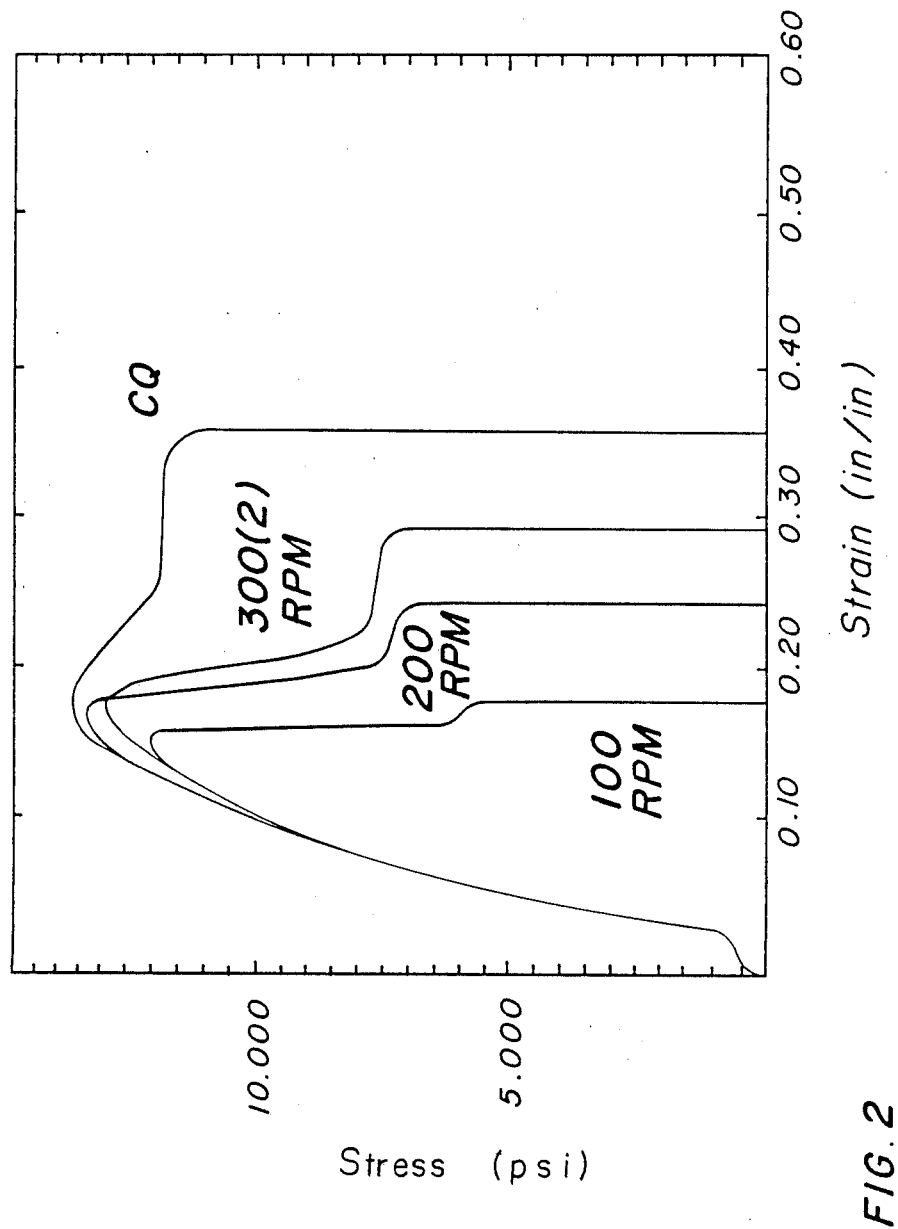
FIG. 2 is a graph illustrating the results of tensile stress-strain tests for a 90/10 ULTEM-VITON blend of the present invention.

There are significant differences in tensile behavior between compositionally quenched and extruded blends. Up to the yield point, the blends produced by both methods perform similarly. They have a tensile modulus and yield strength that are virtually the same, and differences are only manifested in post-yield behavior. The compositionally quenched blend has a much higher strength at break and a larger elongation (%) than any of the extruded blends. There is a clear progression of increasing strength and elongation at break with increasing screw speed in the extrusion blends This progression is illustrated in FIG. 2 which shows tensile tests for individual samples of extruded blend at various screw speeds as well as the compositionally quenched blend.

Figure 3:
FIG. 3 is a scanning electron micrograph (SEM) of a polished and etched surface of the 90/10 ULTEM-VITON blend produced by compositional quenching.

The differences in mechanical behavior of these materials can be linked to their morphological differences FIG. 3 is a scanning electron micrograph of a polished and etched surface of the compositionally quenched blend. The average rubber particle size in this material is approximately 0.3 μm with the largest of these particles being 0.5 μm. The submicron particles are generally spherical in shape. On the other hand, all of the extruded materials included particles that were at least twice the size of the largest rubber domains found in the but instead, highly elliptical.

Figure 5:
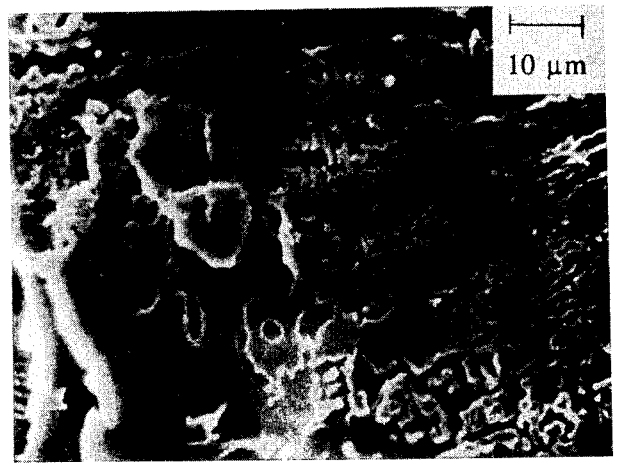
FIG. 5 is a scanning electron micrograph showing a fracture surface produced by a room temperature notched Izod test, for ULTEM polyetherimide alone.
Figure 6:
FIG. 6 is a micrograph similar to FIG. 5 showing the fracture surface of a compositionally quenched blend according to the present invention.

FIGS. 5 and 6 are SEM micrographs of fracture surfaces obtained from a room temperature notched Izod test. FIG. 5 is the fracture surface of ULTEM alone, and FIG. 6 shows the fracture surface of the compositionally quenched blend. The extrusion blended materials had fracture surfaces that were quite similar to the one shown in FIG. 6 for the compositionally quenched blend. The fracture surfaces of the blends are quite sinuous and expose a great deal of surface area. In addition, there seems to be shear yielding of the polymer matrix and rubber particle dislocations on these surfaces. In contrast, the neat ULTEM fracture surface is quite flat. There is little evidence of shear yielding, and the fracture path seems quite direct. It seems likely that the increased toughness of the blend is due to the tortuous path of the fracture along with the extensive yielding that occurs in the modified material. There is no evidence of crazing, and the rubber particles seem to function as shear yielding initiators.

These results agree with the findings of Wu (See Wu, S., Polymer, 26, 1855-1863 (1985)), for a Type II polymer which has a high crack initiation energy but a low crack propagation energy in impact. ULTEM polyimide has a high unnotched impact strength, but a low notched impact strength characteristic of a Type II polymer. Wu states that these materials are rubber toughened mainly be increased matrix yielding. Wu proposed, for Type II blends, that when the distance between rubber particles is less than some critical value, the stress fields around the rubber particles interact considerably to enhance matrix yielding and produce tough behavior. The results here also back Wu's contention that strong adhesion between the rubber and matrix phases as provided by chemical bonding is not necessary and that adhesion provided by van der Waals attractions alone is adequate for toughening.

The most important difference observed between the compositionally quenched material and the extrusion blends is that the extruded blends all showed signs of delamination while the compositionally quenched material did not. These delaminations became obvious when the material was twisted Layer separation and tearing were observed. Delamination in blends is often an indication of incompatibility of the polymers making up the blend. This incompatibility seems to be overcome in the compositionally quenched material presumably by creating a more intimate mixture of the two polymers.

Figure 7:
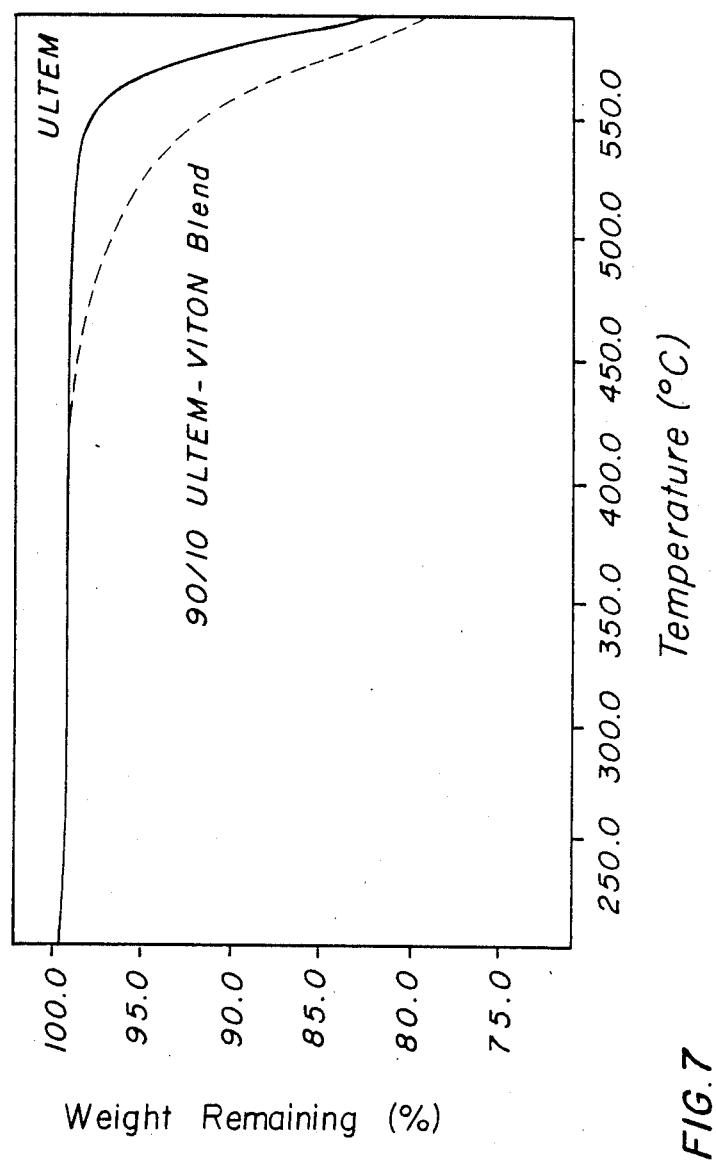
FIG. 7 is a graph illustrating thermogravimetric analysis of ULTEM and 90/10 ULTEM-VITON blend produced by compositional quenching according to the present invention.

FIG. 7 shown the results of thermogravimetric analyses. There were no observable differences in thermal stability between the compositionally quenched and extruded blends. There is some loss of thermal stability in these rubber modified materials as seen from the earlier weight loss in comparison to the neat ULTEM. However, this loss of weight in the blend does not occur until about 425° C.

According to the present invention, thus, a new impact-modified high-temperature blend is produced. The addition of 10% VITON A fluorelastomer to an ULTEM polyetherimide matrix by the process of compositional quenching increases the impact strength of the blend by nearly a factor of three with little sacrifice in modulus, strength, and thermal stability in comparison to ULTEM polyetherimide alone. Elastomer particles formed in this process are spherical in shape with a diameter of approximately 0.5 μm. The particles are not chemically bonded to the matrix. Adhesion due to van der Waals forces alone is sufficient for toughening in this system. The particles seem to act as shear yielding initiators since extensive yielding is apparent on the fracture surfaces of the blends and not on the pure material. These finding agree with the work of Wu for a Type II matrix and suggest that the critical interparticle distance for the toughening of ULTEM polyetherimide is greater than 0.37 μm, the interparticle distance present in the compositionally quenched ULTEM-VITON blend. The compositionally quenched material outperforms conventionally blended materials which were found to have inferior post-yield tensile behavior and suffer from delamination.

The preferred polyetherimides for the purposes of the present invention include a polyetherimide (PEI) of the chemical formula:

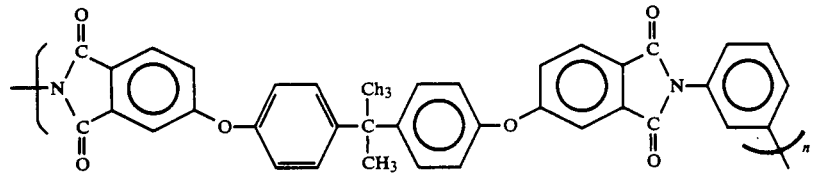

where n represents a whole number in excess of 1, usually 1000 or more. This commercial polyetherimide is available from GE Plastics under the tradename ULTEM 1000. For the purposes of the present invention, the preferred fluorelastomer is a copolymer consisting of 60–85% vinylidene fluoride and 40–15% hexafluoropropylene (PVFHFP). This fluorelastomer is commercial available through E. I. du Point under the tradename VITOM A.

While specific embodiments of the invention have been shown and described in detail to illustrate the application of the principles of the invention, it will be understood that the invention may be embodied otherwise without departing from such principles.

What is claimed is:

1. An impact modified polymer blend comprising a matrix of high-temperature polyetherimide with a micro-dispersion phase of about 5 to 20% by weight high temperature fluorelastomer therein, the fluorelastomer being micro-dispersed by compositional quenching and being present in substantially spherical submicron particles.

2. A blend according to claim 1 wherein the polyetherimide comprises ULTEM polyimide and the fluorelastomer comprises VITON fluorelastomer.

3. A blend according to claim 2 comprises about 80 to 95% by weight ULTEM and about 20 to 5% by weight VITON.

4. A blend according to claim 2 comprises about 90% by weight ULTEM and about 10% by weight VITON.

5. A blend according to claim 4 wherein the ULTEM comprises ULTEM 1000 polyetherimide and the VITON comprises VITON A fluorelastomer.

6. An impact modified polymer blend made by the process of dissolving a high-temperature polyetherimide and a high-temperature fluorelastomer in a common solvent to form a single phase solution, heating the single phase solution to an elevated temperature which is sufficiently high to vaporize the solvent at a selected reduced pressure, maintaining the solvent at an elevated pressure above the selected pressure, and subsequently exposing the solution to a zone at the selected reduced pressure for flash evaporating at least some solvent to form the blend the blend comprising a matrix of the polyether with a micro-dispersion phase of about 5 to 20% by weight of the fluorelastomer therein, the fluorelastomer being present in substantially spherical submicron particles.

7. A blend according to claim 6 wherein the polyetherimide comprises ULTEM polyimide and the fluorelastomer comprises VITON fluorelastomer.

8. A blend according to claim 7 comprising from about 80 to 95% by weight ULTEM and about 20 to 5% by weight VITON.

9. A blend according to claim 8 comprising about 90% ULTEM and about 10% VITON.

10. A blend according to claim 6 wherein the blend contains approximately 60% solvent after introducing the solution into the zone at the selected reduced pressure, the process for producing the blend including subsequently room drying the blend for a selected number of hours to form a room dried blend, exposing the room dried blend to partial vacuum at elevated temperature to produce a further dried blend and subjecting the further dried blend to extrusion.

* * * * *